Figure 1:
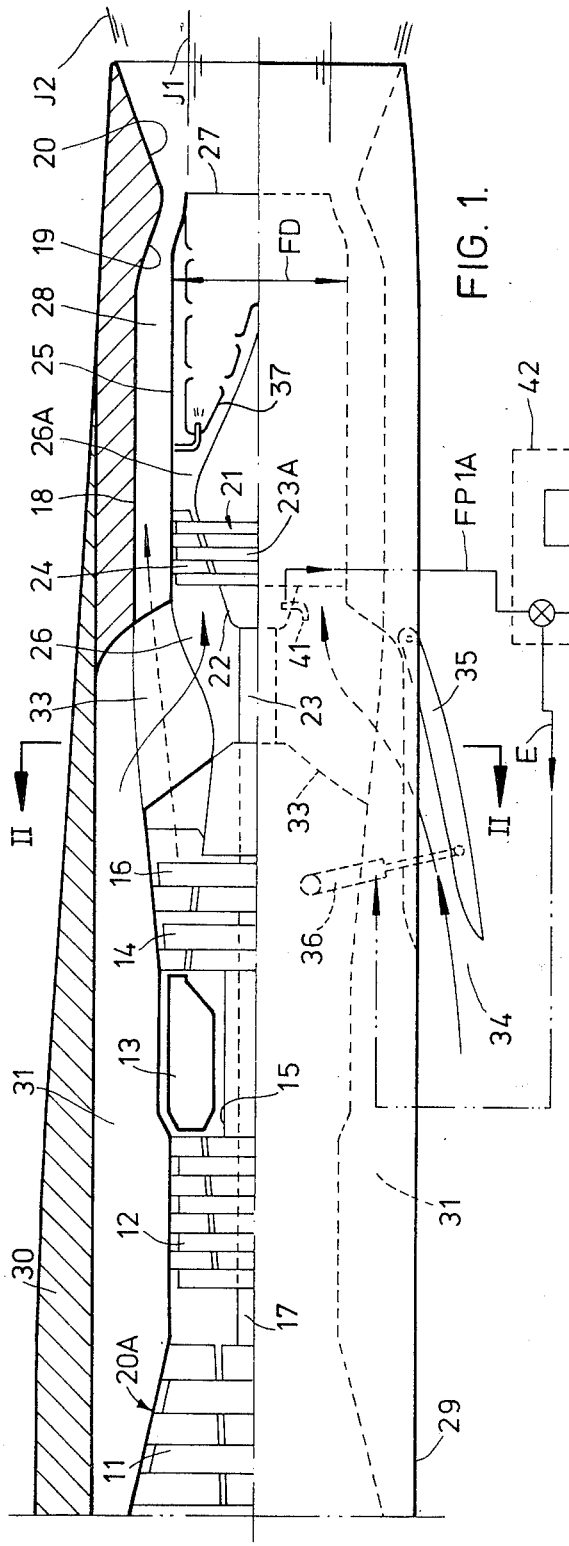

United States Patent [19]
Calder et al.

[11] 3,900,177
[45] Aug. 19, 1975

[54] JET PROPULSION POWERPLANT

[75] Inventors: Peter Henry Calder; Prem Chandra Gupta, both of Bristol; William James Lewis, Winscombe, all of England

[73] Assignee: Rolls-Royce (1971) Limited, London, England

[22] Filed: Oct. 10, 1973

[21] Appl. No.: 405,170

[30] Foreign Application Priority Data
Oct. 14, 1972 United Kingdom............. 47500/72

[52] U.S. Cl.............. 244/53 R; 60/224; 60/226 R; 60/262; 244/53 B
[51] Int. Cl...................... B64d 27/20; B64d 29/04
[58] Field of Search.......... 244/53 R, 53 B; 60/224, 60/226 R, 226 A, 262; 137/15.1, 15.2

[56] References Cited
UNITED STATES PATENTS

| | | | |
|---|---|---|---|
| 3,009,318 | 11/1961 | Skoff | 60/226 R |
| 3,161,019 | 12/1964 | Kennan et al. | 244/53 R X |
| 3,186,661 | 6/1965 | Denning et al. | 244/53 B |
| 3,348,379 | 10/1967 | Wilde et al. | 60/262 X |
| 3,477,455 | 11/1969 | Campbell | 137/15.1 |
| 3,765,179 | 10/1973 | Strang et al. | 244/53 B X |

FOREIGN PATENTS OR APPLICATIONS
1,426,405   5/1969   Germany .......................... 60/226 A Primary Examiner—Trygve M. Blix
Assistant Examiner—Barry L. Kelmachter
Attorney, Agent, or Firm—Stevens, Davis, Miller & Mosher

[57] ABSTRACT

A powerplant for a supersonic aircraft which consists of a gas turbine turbojet engine, as is usual for such aircraft, housed within a square nacelle, the shape of which is determined by the need to provide a two-dimensional variable geometry in the system for dealing with the complete range of operating flight speeds and this dictates a nacelle of a square cross-section fitting closely around the circular engine casing. The spaces at the four corners between the exterior of the engine casing and the interior of the nacelle are used to supply air to a fan driven by a turbojet engine which thus takes energy from the turbojet efflux and produces an overall reduction in jet velocity thereby reducing the noise.

4 Claims, 3 Drawing Figures

JET PROPULSION POWERPLANT

This invention relates to a jet propulsion power plant for use in an aircraft capable of supersonic speeds and is particularly directed to an engine adapted in relation to known engines to generate less noise at take off substantially without incurring performance penalties at either take-off or supersonic speeds.

It is desirable that for supersonic flight an engine nacelle should be of substantially constant section along its length for the avoidance of wave drag and further desirable that the cross-sectional area of the nacelle should be as small as possible. Thus the conventional solution within these two constraints is to adopt a reheated turbojet cycle, reheat being used for take off and transonic acceleration. It is known from noise studies that the noise generated by a jet engine is proportional to the eighth power of its jet efflux velocity and it is a consequence of the reheated turbojet cycle that the engine has a high exhaust velocity and indeed a fairly high exhaust velocity is essential to permit supersonic operation of the aircraft.

In general it is desirable to achieve substantial noise reductions at take off for it is at take off that the aircraft is closest to the ground and the noise generated is most objectionable.

For a given thrust a reheated turbojet engine is of relatively smaller diameter and longer than, say, a fan type gas turbine engine. The extra length is necessary to provide space in which to do sufficient work on a mass of air to produce a high velocity jet efflux. It will be understood that, if for a given take off thrust the jet efflux velocity is reduced, then significant noise reductions can be achieved.

It is however undesirable that either the length or width of the engine, and hence the nacelle, be increased above that which is strictly necessary for transonic acceleration and supersonic cruise, in order to reduce the jet efflux velocity at take off whilst maintaining the same take off thrust. Increasing the length of the engine, apart from being accompanied by an increase in weight, makes the structural design of an already long engine more difficult and any increase in width brings an increased drag penalty.

The actual sizing of the nacelle can be achieved by making it the minimum size necessary to accommodate the turbojet engine and the cooling flow which is required to cool the carcass and accessories of the engine.

It is an object of the present invention to provide an adapted turbojet engine capable of fitting within a nacelle of substantially the same size as would be necessary to accommodate a conventional reheated turbojet engine of the same thrust, without substantially increasing the overall length of the nacelle and at the same time to yield substantially lower noise levels at take off than could be achieved with the said conventional reheated turbojet engine.

According to this invention there is provided a jet propulsion power-plant comprising a gas turbine turbojet engine, a casing for the engine having a substantially circular cross-section, a nacelle shaped for supersonic flight speeds in which the engine in its casing is located, the nacelle having a substantially square cross-section and defining with the casing a duct which thereby has an exterior periphery which is substantially square in cross-section and an interior periphery which is substantially circular in cross-section, the nacelle having an inlet capable of receiving ambient air at flight speeds up to supersonic speeds and being arranged for supplying air to both said engine and said duct, characterised by a fan located within said nacelle and driven by said turbojet and adapted to receive air at least in part through said duct.

The powerplant according to this invention may comprise, in flow series, an air intake, a compressor, combustion equipment, a turbine connected to drive the compressor, a jet pipe means and convergent-divergent nozzle, all defining a gas turbine turbojet engine; and further comprising the engine casing enclosing said compressor and turbine, the fan situated aft of the turbine and shaft-connected thereto, a further duct defined by a further casing enclosing the fan and having an outlet for the fan delivery situated within the nozzle co-axially therewith, and means for varying the mass flow through the fan constituted by air inlet means for the fan in parallel with said intake.

The arrangement according to this feature of the invention makes it possible to introduce a variable mass flow together with a gas turbine turbojet engine in a nacelle whose cross-sectional area is determined by the engine casing, i.e. not further determined by significant mass flow influencing components, e.g. a front fan, having a diameter larger than that of the engine casing.

Figure 1A:
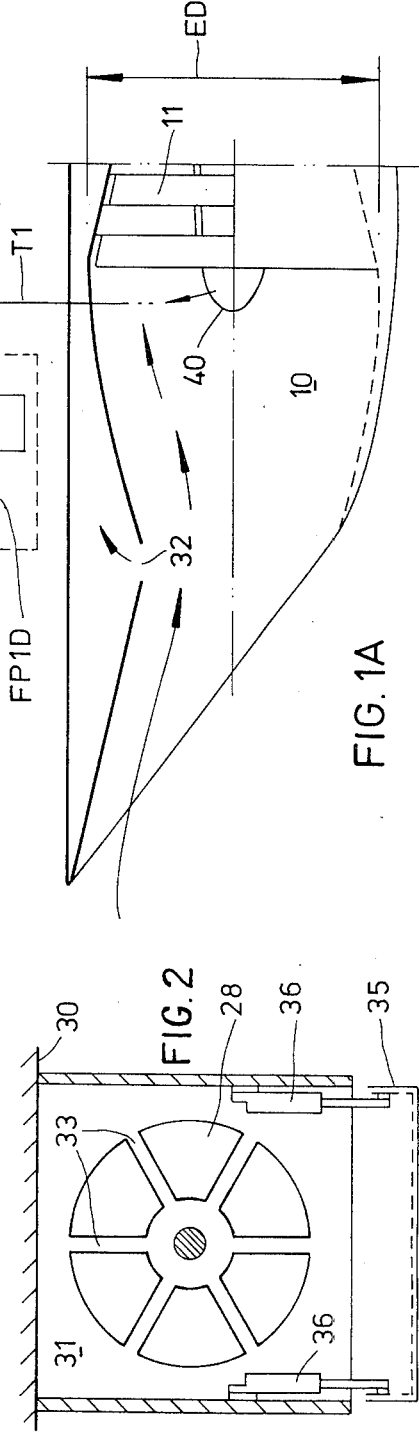
Figure 2:
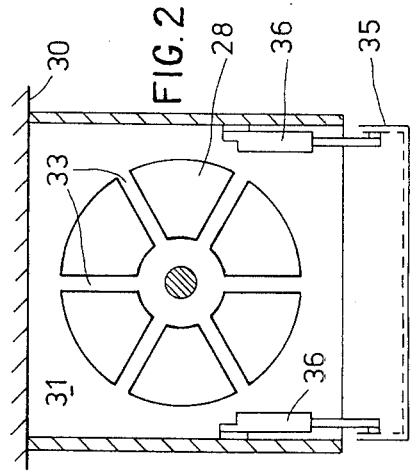

Embodiments of the invention will now be described, by way of example only, with reference to the accompanying drawings, wherein:

FIG. 1 is a longitudinal section through a powerplant constructed in accordance with the invention, FIG. 1A is a continuation of FIG. 1, FIG. 2 is a section on the line II–II in FIG. 1, Referring to FIGS. 1 and 2 of the drawings, there is provided in flow series, a main air intake 10, a low pressure compressor 11, a high pressure compressor 12, a combustor 13, a high pressure turbine 14 connected by a shaft 15 to the compressor 12, a low pressure turbine 16 connected by a shaft 17 to the compressor 11, a jet pipe 18, a convergent nozzle 19 and a divergent nozzle 20. The jet pipe is a continuation of a casing 20A enclosing the components 11 to 16 inclusive which constitute a gas turbine turbojet engine. The casing 20A is of substantially circular cross-section along its length.

Concentrically within the jet pipe 18 there is disposed a fan 21 comprising a rotor body 22 connected by a shaft 23 to the low pressure turbine 16 to be driven thereby. Several stages 23A of rotor blades secured to the rotor body co-operate with corresponding stages 24 of stator blades secured to a casing 25 surrounding the body 22 and forming together therewith ducts 26, 26A respectively upstream and downstream of the fan. The duct 26A terminates in a nozzle 27.

The exhaust from turbine 16 is led to the nozzles 19, 20 through a duct 28 formed by the exterior of the casing 25 and the jet pipe 18.

The power plant is arranged within a substantially square section nacelle 29 connected to the underside of an aircraft wing 30. The nacelle is provided with ramps of variable geometry which are arranged to supply air to the turbojet engine at the desired intake conditions throughout the range of supersonic speeds for which the engine is intended. Details of these ramps are well known to those versed in the art. Between the nacelle and the casing 20A there is formed a duct 31 connected at one end to the intake 10 by an opening 32 upstream of the compressor 11 and connected at the other end to the duct 26 by hollow vanes 33 extending radially across the duct 28. The opening 32 is a first inlet opening for the fan 21 and is provided at the narrowest part of the intake 10 and so as to face the side of the air stream therethrough. In consequence flow through the opening 32 is of low energy compared with free-stream total pressure. The duct 31 is defined by the inside of the nacelle 29 and the outside of the casing 20A and thus has an exterior periphery which is substantially square in cross-section and an interior periphery which is substantially circular in cross-section.

A second inlet opening 34 for the fan 21 is provided at the lower side of the nacelle and connected through part of duct 31 to the duct 26. The opening 34 is controlled by a hinged scoop-like door 35 operable by actuators 36. The opening 34 faces the free stream air so that when the door is open air having high energy relative to the engine is added to that from the opening 32 with a consequent rise in the total pressure at the face of the fan 21. The opening of the door 35 constitutes varying the mass flow of the fan.

The main purpose of the fan is to make it possible to increase the mass and lower the velocity of the jet from the nozzle 20 so as to improve propulsive efficiency and reduce noise at take-off and in the lower part of the flight speed range. For the upper part of the flight speed range, where higher jet velocities are required and where noise is unimportant, it is then desirable to reduce the mass flow of fan 21 for reasons of cycle and propulsion efficiency.

The flight speed at which the fan mass flow is reduced may be matched not only to propulsive efficiency but also to the loading of the turbine 16. The total load on the latter is due to the compressor 11 and the fan 21. As regards the fan, the load constituted thereby is a function of rotational speed, the inlet temperature and the total inlet pressure of the fan. The pressure component of this relationship can be effectively controlled by the door 35.

As regards the load constituted by the compressor 11, this is at its highest in the upper part of the flight speed range. This means that while in the lower part of that range the turbine has power to spare to drive the fan 21 and that in said upper part of the range the fan 21 has its mass flow reduced and this leaves enough power for driving the compressor 11. In this way efficient use is made of available turbine power.

An important parameter influencing the point at which the turbine 16 can no longer cope with both the compressor 11 and full mass flow of the fan 21 is the inlet temperature of the compressor 11. This occurs at Mach numbers of the order of 1.3 where the ram temperature rise due to forward speed off-sets the low ambient temperatures which exist at altitude conditions.

Accordingly, the powerplant has a control system in which an output T1 of a temperature sensor 40 in the intake 10 is led to a computer 42 adapted to determine the power which can be spared for the fan in terms of a fan inlet pressure FP1D corresponding to that power.

The latter pressure is compared with the output FP1A of a pressure sensor 41 in the duct 26 to determine an error signal E connected to the actuator 36 to move the door 35 in the sense that if the computed pressure value falls below the actual value FP1A the door 35 is closed and vice versa. To make the calculation non-dimensional the mechanical speed of the turbine 11 and the temperature in the duct 26 are taken into account by appropriate sensors (not shown) connected to the computer.

It will be seen that when the door 35 is closed the air coming through the inlet 32 continues to flow. This is done to provide the minimal flow necessary to avoid fan stall and to establish an inner core jet J1 capable of forming an inner boundary for the annular jet J2 emanating from the duct 28.

It will be clear that the expansion ratios of the jets J1, J2 are complementary, i.e. in supersonic flight the expansion ratio of the jet J2 has the greater value while in subsonic flight, with the fan in operation, the two expansion ratios are more nearly the same.

A combustion chamber 37 is introduced in the duct 26A for the purposes of increasing the thrust of jet J1 and controlling fan jet velocity and satisfying fan aerodynamics.

The fan is so proportioned that its casing 25 has a diameter FD lying within the maximum axially projected area of the casing 20A, i.e. within the greatest diameter ED of the casing 20A. In this way the fan does not add to the frontal area of the engine. The jet pipe 18 takes up the space between the casing 25 and the interior of the nacelle 29. The nacelle itself has an external cross-sectional area determined by the diameter ED, i.e. its greatest transverse extent is not substantially greater than the diameter ED. In the context of a square nacelle, which is the case here, it is the width of the nacelle which is not substantially greater than the diameter ED. In this way the nacelle is distinguished, for example, from a nacelle intended to enclose an engine and a front fan required to drive a by-pass flow over the exterior of the engine casing. However, the nacelle is sufficiently large to allow for the presence of the duct 31 were extending between the nacelle and the casing 26A at the front end of the engine, and to allow for structural thickness of the nacelle walls and for minor aerodynamic fairings at the leading and trailing ends of the nacelle. Generally, the cross-section of the nacelle is uniform along the length thereof so as to keep wave drag in supersonic flight to a minimum.

The degree of wave drag acceptable in any one case may vary according to flight plan. For example, in an aircraft intended to cruise at supersonic speeds low wave drag is vital from the point of view of fuel consumption. A decision as to what constitutes an acceptable departure from precise uniformity of cross-section can therefore be made in any one case and a dividing line can in practice be drawn between the cross-sectional disuniformity which would be acceptable for a supersonic nacelle as distinct from a subsonic nacelle where, relatively, a very high degree of such disuniformity is acceptable.

The jet pipe 18 may be of a diameter larger than the diameter ED to the extent permitted by the nacelle, or minor enlargements of nacelle size may be made to accommodate small additional space requirements of the jet pipe.

What we claim is:

1. A jet propulsion powerplant comprising a gas turbine turbojet engine, a casing for the engine having a substantially circular cross-section, a nacelle shaped for supersonic flight speeds in which the engine in its casing is located, the nacelle having a substantially square cross-section and defining with the casing a duct which thereby has an exterior periphery which is substantially square in cross-section and an interior periphery which is substantially circular in cross-section, the nacelle having an inlet capable of receiving ambient air at flight speeds up to supersonic speeds and being arranged for supplying air to both said engine and said duct, characterised by a fan located within said nacelle downstream of the turbojet engine and connected to the turbojet engine thereby to be driven by the turbojet engine, said fan having a rotational diameter less than the greatest rotational diameter of the turbojet engine said duct being connected to supply air from said inlet around the exterior of said casing to said fan, and means positioned substantially downstream of said turbojet for introducing additional air into said fan thereby to increase the air flow through said fan.

2. A powerplant according to claim 1, wherein the jet efflux of the turbojet is arranged to pass around the outside of the fan so that in operation the fan efflux is substantially surrounded by the turbojet efflux.

3. A powerplant according to claim 1, wherein said means comprise a flap in the nacelle capable of being opened to introduce air into said fan in parallel with said duct.

4. A jet propulsion powerplant comprising:
a gas turbine turbojet engine, said engine including in flow series a low pressure compressor, a high pressure compressor, a combustor, and a low pressure turbine coupled to said low pressure compressor, a casing having a substantially circular cross-section surrounding said turbojet engine, a nacelle having a substantially square cross-section surrounding said casing, said nacelle and casing defining a duct having an exterior periphery which is substantially square in cross-section and an interior periphery which is substantially circular in cross-section, said nacelle having an inlet for receiving ambient air at flight speeds up to supersonic speeds and supplying air to both said turbojet engine and said duct, a fan located within said nacelle downstream of said turbojet engine coupled to said low pressure turbine, said fan having a rotational diameter less than the greatest rotational diameter of the turbojet engine and a flap in said nacelle for introducing additional air into said duct, the air received by said fan from said duct being controlled by the position of said flap to vary the mass flow of said fan.

* * * * *